March 25, 1958     H. GOEDE     2,827,883
INTERNAL COMBUSTION ENGINE
Filed April 24, 1956
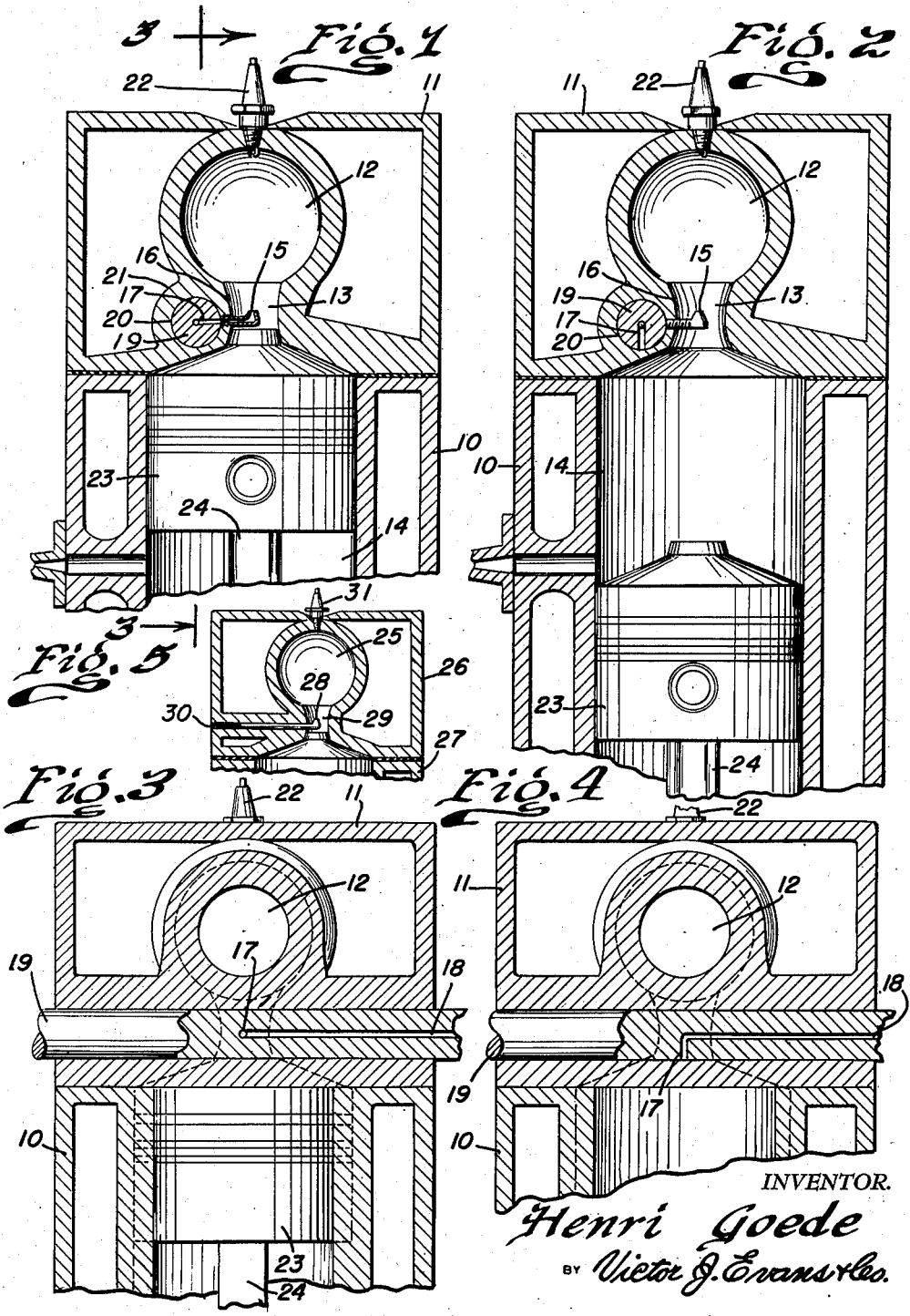
INVENTOR.
Henri Goede
BY Victor J. Evans & Co.
ATTORNEYS

United States Patent Office

2,827,883
Patented Mar. 25, 1958

2,827,883

INTERNAL COMBUSTION ENGINE

Henri Goede, Brooklyn, N. Y.

Application April 24, 1956, Serial No. 580,333

4 Claims. (Cl. 123—32)

This invention relates to internal combustion engines of the diesel type, and in particular a cylinder having a combustion chamber in the head and spaced from the end thereof with a small passage providing a venturi action wherein with an injector extended through the wall of the passage the fuel is drawn into the combustion chamber wherein combustion may be assisted by the spark plug.

The purpose of this invention is to provide an internal combustion engine of the diesel type, in which gasoline, kerosene, or diesel oil may be used as fuel.

With the conventional type of diesel engine explosive fuel is injected under high pressure into the combustion chamber and with the compression increased by upward travel of the piston explosion takes place and the piston is driven downwardly in the power stroke. Engines of this type require high pressure and pumps or other compressing means are required in combination with the engine. With this thought in mind this invention contemplates a method of injecting fuel into combustion chambers of internal combustion engines of the diesel type wherein the fuel is injected with a siphon or venturi action wherein conventional compressors are not required.

The object of this invention is, therefore, to provide means for forming a combustion chamber at the end of a cylinder, particularly of an engine of the diesel type wherein the combustion chamber is connected to the cylinder through a throat or relatively narrow passage whereby, in being driven into the combustion chamber the fuel passes through the throat drawing the fuel into the chamber through an injector.

Another object of the invention is to provide an internal combustion engine of the diesel type in which gasoline, kerosene or diesel oil may be used as fuel.

Another object of the invention is to provide an internal combustion engine of the diesel type in which compression for igniting the fuel is obtained without an auxiliary pump or compressor.

A further object of the invention is to provide an improved internal combustion engine of the diesel type which is of a simple and economical construction.

With these and other objects and advantages in view the invention embodies an internal combustion engine of the diesel type having a cylinder block with a cylinder therein, a piston in the cylinder, a head having a spherical combustion chamber with a passage extended from the lower part to the cylinder, and an injector mounted in the passage or throat and positioned to register with a fuel passage extended through a rod rotatably mounted in the head and positioned at one side of the throat or passage.

Other features and advantages of the invention will appear from the following description taken in connection with the drawing, wherein:

Figure 1 is a cross section through the upper portion of an internal combustion engine showing a spherical combustion chamber connected by a constricted passage to the upper end of a cylinder of the engine, with a spark plug extended into the combustion chamber and with an injector extended from a rotary valve member, into the passage connecting the combustion chamber to the cylinder.

Figure 2 is a cross section, similar to that shown in Fig. 1, showing the piston of the engine in the lower position and also showing the injector supply passage in the closed position.

Figure 3 is a longitudinal section through a portion of the engine taken on line 3—3 of Fig. 1 showing, in particular, the valve rod for supplying fuel to the injector extended into the passage between the combustion chamber and cylinder.

Figure 4 is a section similar to that shown in Fig. 3 showing the device with the valve rod turned to the closed position.

Figure 5 is a section similar to that shown in Fig. 1 with the parts shown on a reduced scale illustrating a modification wherein the injector extends from the outer wall of the head of the engine.

Referring now to the drawing wherein like reference characters denote corresponding parts the improved internal combustion engine of the diesel type of this invention includes a cylinder block 10, a head 11, a combustion chamber 12 positioned in the head and having a throat or narrow passage 13 providing communicating means between the combustion chamber and a cylinder 14 in the engine block 10, and an injector 15 mounted in a side wall 16 of the section of the head positioned between the combustion chamber and cylinder and positioned to register with an end 17 of a passage 18 in a valve rod 19 mounted in a longitudinally disposed opening 20 in a boss 21 extended along one side of the throat between the combustion chamber and cylinder. Fuel is supplied under pressure to the combustion chamber 12 through the injector 15 which extends into the center of the throat 13 and which is L-shaped, having a concial-shaped head whereby fuel is atomized or volatilized as it is injected under pressure into the combustion chamber.

The combustion chamber may be provided with a spark plug 22 and a piston 23 in the cylinder 14 may be connected to a conventional crankshaft with a connecting rod 24.

With the parts positioned as illustrated and described downward travel of the piston 23 draws fuel and air into the upper end of the cylinder 14 and upper travel of the piston drives the fuel and air through the passage 13 which being of negative pressure creates a venturi or suction on the injector 15 whereby fuel and air for combustion are supplied to the chamber 12 and the high pressure may be assisted, by the spark plug 22 to ignite the fuel in the combustion chamber and drive the piston downwardly in the power stroke. The burnt fuel is exhausted by conventional means.

In the design illustrated in Fig. 5 a combustion chamber 25 in a cylinder head 26 on a cylinder block 27 is supplied with fuel for combustion by an injector 28 in a venturi passage 29, the injector being positioned in the inner end of a passage 30 extended to the exterior of the cylinder head. The passage 30 may be connected to suitable means for supplying fuel for combustion. A spark plug 31 may be provided in the upper end of the combustion chamber or cylinder head.

The injector is L-shaped and being positioned in the throat where negative pressure exists the fuel being injected under high pressure volatilizes.

Upward movement of a piston in the cylinder block 27 drives fuel in the upper end of the cylinder through the passage 29 drawing fuel for ignition through the injector 28 and upon the piston reaching the upper end of the stroke the fuel is ignited by pressure and also by the spark plug 31, if desired.

It will be understood that other modifications, within the scope of the appended claims, may be made in the design and arrangement of the parts without departing from the spirit of the invention.

What is claimed is:

1. An internal combustion engine comprising a cylinder block having a cylinder with a piston therein opening through the upper end, a head having a combustion chamber with a throat opening through the lower end positioned on the cylinder block with the throat providing communicating means between the combustion chamber and cylinder, a valve rod rotatably mounted in the head and positioned at one side of the throat, and an injector having a conical-shaped head extended into the throat providing communicating means between a fuel passage in the valve rod and throat and positioned to discharge fuel under pressure into the combustion chamber.

2. An internal combustion engine comprising a cylinder block having a cylinder with a piston therein opening through the upper end, a head having a combustion chamber with a throat opening through the lower end positioned on the cylinder block with the throat providing communicating means between the combustion chamber and cylinder, a valve rod rotatably mounted in the head and positioned at one side of the throat, an injector having a conical-shaped head extended into the throat and providing communicating means between a fuel passage in the valve rod and throat, the conical-shaped head of the injector being positioned to discharge atomized fuel into the combustion chamber, and a spark plug positioned in said combustion chamber.

3. In an internal combustion engine, the combination which comprises a cylinder block having a cylinder therein, a piston in the cylinder, a head having a spherical combustion chamber therein positioned on the cylinder block, said head having a narrow passage providing a throat between the combustion chamber and cylinder, a valve rod rotatably mounted in the cylinder head and positioned at one side of the narrow passage, said rod having a fuel supply passage extended therethrough, and an injector having a conical-shaped head positioned in the side of the narrow passage and providing communicating means between the opening through the valve rod and throat, the conical-shaped head of the injector being positioned to discharge fuel into the negative pressure area of the throat wherein the fuel is volatilized and injected into the combustion chamber.

4. In an internal combustion engine, the combination which comprises a cylinder block having a cylinder therein, a piston in the cylinder, a head having a spherical combustion chamber therein positioned on the cylinder block, said head having a narrow passage providing a throat between the combustion chamber and cylinder, a valve rod rotatably mounted in the cylinder head and positioned at one side of the narrow passage, said rod having a fuel supply passage extended therethrough, an injector having an L-shaped head positioned in one side of the narrow passage and providing communicating means between the opening through the valve rod and throat the injector discharging the fuel into the area of negative pressure in the narrow passage whereby the fuel being injected under pressure volatilizes as it is injected into the combustion chamber, and a spark splug mounted to extend into the combustion chamber.

References Cited in the file of this patent

UNITED STATES PATENTS

| | | |
|---|---|---|
| 1,437,396 | Brush | Dec. 5, 1922 |

FOREIGN PATENTS

| | | |
|---|---|---|
| 679,864 | France | Apr. 18, 1930 |
| 739,663 | Germany | Oct. 1, 1943 |
| 664,175 | Great Britain | Jan. 2, 1952 |